United States Patent [19]

Malcolm

[11] Patent Number: 5,635,562

[45] Date of Patent: Jun. 3, 1997

[54] EXPANDABLE VIBRATION DAMPING MATERIALS

[75] Inventor: Collin C. Malcolm, Southfield, Mich.

[73] Assignee: Lear Corporation, Southfield, Mich.

[21] Appl. No.: 429,313

[22] Filed: Apr. 26, 1995

[51] Int. Cl.$^6$ .................................................. C08F 8/00
[52] U.S. Cl. .................... 525/108; 525/112; 525/122; 525/191; 521/50; 521/76; 521/79; 521/80; 428/138; 267/158; 296/189
[58] Field of Search .................. 521/50, 76, 79, 521/80; 525/108, 112, 122, 191; 248/638, 27.1; 264/3.3, 9, 13, 158; 296/189; 428/246, 138

[56] References Cited

U.S. PATENT DOCUMENTS

| | | |
|---|---|---|
| 3,770,560 | 11/1973 | Elder et al. . |
| 3,894,169 | 7/1975 | Miller . |
| 4,118,258 | 10/1978 | Graveron et al. . |
| 4,495,240 | 1/1985 | McCarthy . |
| 4,740,427 | 4/1988 | Ochiumi et al. . |
| 4,883,717 | 11/1989 | Kitamura et al. . |
| 4,887,788 | 12/1989 | Fischer et al. . |
| 4,987,194 | 1/1991 | Maeda et al. . |
| 5,008,324 | 4/1991 | Killgoar, Jr. et al. . |
| 5,066,708 | 11/1991 | Koller, Sr. et al. . |
| 5,162,156 | 11/1992 | Troughton, Jr. et al. . |
| 5,213,879 | 5/1993 | Niwa et al. . |
| 5,271,612 | 12/1993 | Tada et al. ........................ 267/158 |
| 5,350,610 | 9/1994 | Mashita et al. . |

*Primary Examiner*—Samuel A. Acquah
*Assistant Examiner*—Duc Truong
*Attorney, Agent, or Firm*—Harness, Dickey & Pierce, P.L.C.

[57] ABSTRACT

The present invention relates to relatively inexpensive multi-purpose expandable vibration damping material compositions particularly useful in constrained layer applications. The composition essentially includes an elastomeric polymer, plasticizer, thermoplastic polymer, foaming agent, adhesion promoters and filler. In addition to the aforementioned, under certain embodiments, the expandable vibration damping material compositions may also employ rheological modifiers such as cross-linking agents and epoxy curing agents.

33 Claims, 2 Drawing Sheets

EXPANDABLE VIBRATION DAMPING MATERIALS

BACKGROUND OF THE INVENTION

1. Field of the Invention

The present invention relates to multi-purpose damping materials capable of absorbing vibration from various structures and, more particularly, to expandable vibration damping materials especially useful in constrained layer assemblies. In addition to the vibration damping characteristics offered by the materials of the present invention, the materials also provide excellent adhesion to various substrates, improved corrosion resistances to metal components and long term durability.

2. Description of Related Art

One relatively recent focus in the automobile industry has been to control and, preferably, the elimination of noise occurring as the result of the vibration of automobile body panels. To this end, important reductions in automobile noise levels have been achieved by the vibration damping of automobile body panels such as floor panels, door panels, roof panels, and wheel house panels, among others. To effectuate this so-called vibration damping, compositions containing fillers dispersed in binders have been widely used to coat metallic surfaces of automobile body panels to provide the desired vibration damping and/or sound deadening. For example, sheet materials of heat softenable compositions including asphalt, fillers and natural and/or synthetic elastomers have been used for sound deadening as described in detail in U.S. Pat. No. 4,133,932 which issued to Sumner.

Sheet materials as described above are presently used in the automotive industry by disposing the sheet material in contact with the desired automobile panel section and thereafter transporting the automobile body through heating ovens such as those utilized for drying paint finishes. In response to the temperatures of the oven, the sheet material softens and conforms to the contour of the automobile panel section. The softening of the sheet material must be controlled or restrained, however, so that flowing or running of the thermoplastic material does not exceed a predetermined rate at elevated temperatures. This is often problematic in that many of the vibration damping materials currently known utilize too much low molecular weight polymer(s), which results in flow problems.

Additionally, the automotive industry has been focusing on vibration damping materials which offer weight reduction over previously known compositions in order to improve fuel efficiency. To this end, polymer based expandable or foamed sound deadening sheet materials of reduced density have been considered, but are generally relatively expensive, and, thus, are considered to be cost prohibitive. The increased expense in foamed sheet materials results from the high concentration of polymers required to provide acceptable functional integrity. In an attempt to reduce material costs, a class of vibration damping materials has been developed which employ asphaltic materials, which in turn reduces the amount of polymers required in the composition. These materials also tend to suffer from unacceptably high flow rates.

For a further understanding of the general nature of vibration damping materials and various constructions under which such materials are employed, reference can be made to U.S. Pat. Nos. 4,456,705 which issued Jun. 26, 1984, to McCarthy; U.S. Pat. No. 4,734,323 which issued Mar. 29, 1988, to Sato et al.; U.S. Pat. No. 5,213,879 which issued May 25, 1993 to Niwa et al; and U.S. Pat. No. 5,300,355 which issued Apr. 5, 1994, to Minufe et al., among others.

Although numerous vibration damping materials and constructions are known and currently employed in the automotive industry, heretofore, the known vibration damping materials have failed to provide or have provided only on a limited scale one or more functions including ease in application, expandability to provide a complete fill between substrates, adhesion to substrates formed from a variety of different materials without requiring pretreatment of the substrate surface with adhesives and/or primers, long term storage capability without requiring separation sheets between contiguous layers, enhanced structural integrity for the components to which the material is applied and enhanced corrosion resistance, among others. It is therefore the object of the present invention to provide a vibration damping material composition which performs each of these functions. Still further, the vibration damping material compositions of the present invention serve to shift structure borne noise which is not fully damped to different frequencies that are more easily treated with conventional interior acoustic treatments such as sound absorbing foams and fibrous mats, among others.

SUMMARY OF THE INVENTION

The present invention provides relatively inexpensive vibration damping material compositions which are formable to the contour of the substrate to which they are applied. The compositions and methods of the present invention essentially employ: (a) an elastomeric polymer; (b) at least one plasticizer; (c) a thermoplastic polymer; (d) at least one adhesion promoting agent; (e) at least one foaming agent; (f) one or more fillers; and optionally one or more rheological modifiers.

The vibration damping material compositions of the present invention generally meet each of the requirements of the automobile industry with regard to temperature dependent softening, restrained flow characteristics, adhesion, corrosion inhibition, and formability. In use, the vibration damping materials may be processed into a number of different forms but typically will be in the form of an elongated extruded sheet which can be stored in rolls or stacked in sheets. The vibration damping material is applicable to various substrates through the use of temporary adhesives or mechanical fasteners as are known in the art, or most preferably, is applicable by heat staking the material to the desired substrate. Thereafter, upon attachment to or in close association with the desired substrate, the material is heated which in turn softens the material allowing it to both expand and conform to the contours of the substrate. Upon curing the vibration damping material, a vibration absorbing product having a strong, selectively deformable consistency is provided.

DETAILED DESCRIPTION OF THE PREFERRED EMBODIMENT

Figure 1:
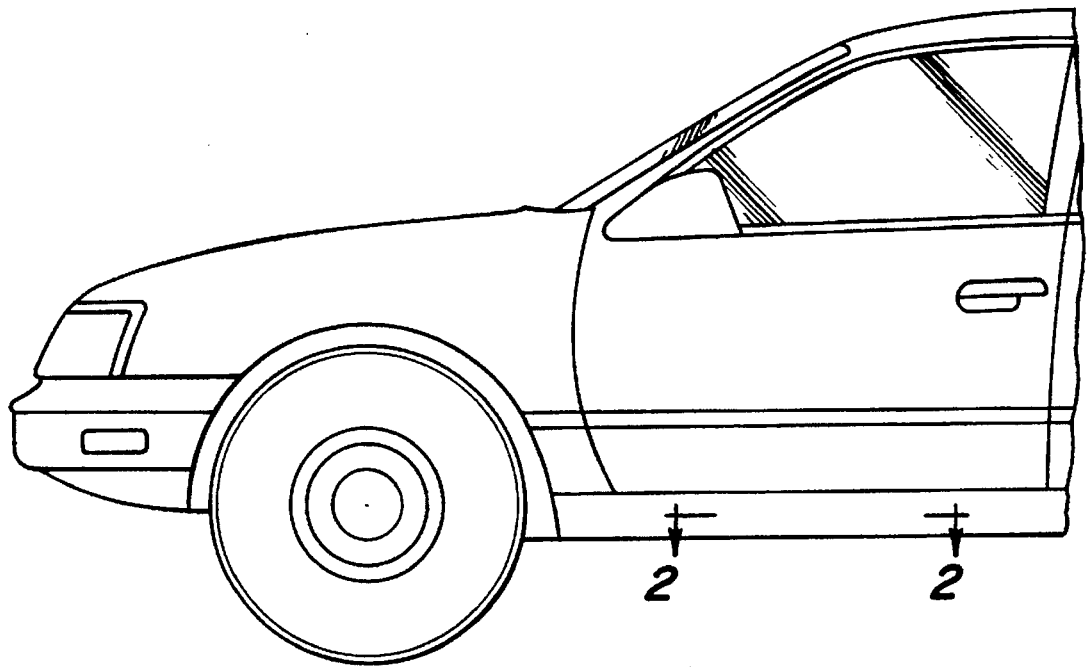
FIG. 1 is a side elevational view of an automotive vehicle.

The expandable vibration damping materials of the present invention generally are formed from heat curable compositions comprising one or more of each of the constituents including: (a) elastomeric polymer; (b) plasticizer; (c) thermoplastic polymer; (d) adhesion promoting agent; (e) at least one foaming agent; (f) filler; and optionally, one or more rheological modifiers. The composition and percentage by weight of the constituents employed in accordance with the teachings of the present invention based on a total constituency of 100.0% by weight are set forth in Table I below:

TABLE I

|  | General | Preferred |
|---|---|---|
| (1) Elastomeric Polymer | 2.0–24.0 wt. % | 10.0–14.0 wt. % |
| (2) Plasticizer | 2.0–14.0 wt. % | 6.0–10.0 wt. % |
| (3) Thermoplastic Polymer | 2.0–22.0 wt. % | 10.0–16.0 wt. % |
| (4) Adhesion Promoting Agent | 2.0–20.0 wt. % | 8.0–14.0 wt. % |
| (5) Foaming Agent | 0.02–5.0 wt. % | 2.0–4.0 wt. % |
| (6) Filler | 40.0–70.0 wt. % | 50.0–60.0 wt. % |
| (7) Rheological Modifiers |  |  |
| (a) cross-linking agent | 0.0–0.8 wt. % | 0.2–0.5 wt. % |
| (b) epoxy curing agent | 0.02–0.5 wt. % | 0.15–0.3 wt. % |

The elastomeric polymer(s) employed in the vibration damping material of the present invention are typically based on natural or synthetic rubber or mixtures thereof. The synthetic rubbers which are considered useful, include styrene-butadiene copolymers, styrene-butadiene block copolymers, polyisobutylene, ethylene-propylene copolymers, ethylene-propylene diene terpolymers, and mixtures thereof.

Under highly preferred embodiments of the present invention, the elastomeric material utilized would be a tri-block copolymer including both polystyrene and vinyl bonded polyisoprene blocks wherein the isoprene midblocks exhibit extensive 3,4 polymerization. Generally, the ratio of polystyrene to vinyl bonded polyisoprene contained in the tri-block copolymer is on the order of approximately 1:4.

Among the commercially available products which have been found to be useful in accordance with the teachings of the present invention are KRATON D1107 which is available from the Shell Oil Company of Houston, Tex.; VECTOR 4111 available from the Exxon Corporation of Houston, Texas and, most preferably, SEPTON VS-1 which is available from Kuraray Company, Limited of Kurashiki, Japan. Ideally, the elastomers utilized will have high vibration damping capabilities at room temperature, be curable in a manner similar to vulcanized rubbers, and have a high affinity to polyolefins, styrenics and vinyl polymers.

As noted in Table I, the elastomeric polymer is present at a level of between about 2.0% to about 24.0% by weight of the total composition. In more preferred embodiments, the elastomeric polymer constituent comprises about 6.0% to about 18.0% by weight of the total composition, and still more preferably between about 10.0% to about 14.0% by weight of the total composition.

One or more plasticizers are also generally employed in combination with the elastomeric polymer material to provide enhanced sound deadening characteristics to the vibration damping material. Among the many suitable commercially available plasticizers which are considered useful, those including PARAPOL 450, PARAPOL 700, PARAPOL 950 and PARAPOL 2500 which are polybutene based plasticizers available from Exxon Chemicals are considered to be particularly useful. Still other plasticizers such as TUF-FLO 1200 which is a napthenic based plasticizer available from Exxon Chemicals; DINP which is a phthalate based plasticizer and PLATINOL 711 which is a phthalate based plasticizer, both of which are available from the BASF Corporation, and SHELLFLEX 3311 which is a napthenic based plasticizer available from the Shell Oil Corporation are considered also to be highly useful.

The plasticizer or plasticizer mixture employed should preferably be present in an amount of from about 2.0% to about 14.0% by weight of the total composition. More preferably, the plasticizer constituency should be present in an amount of from about 4.0% to about 12.0% by weight, and still more preferably in an amount of between about 6.0% to about 10.0% by weight of the total composition.

The thermoplastic polymers employed in accordance with the teachings of the present invention may include any one of a number of commercially available thermoplastic polymers or mixtures thereof including, but not necessarily limited to those based on ethylene vinyl acetate, acrylics, polyethylene and polypropylene. By way of example, certain thermoplastic polymers marketed under the ELVAX tradename by the E. I. Dupont de Nemours Company have proven useful. Among the ELVAX family of thermoplastic polymers, those sold as ELVAX 40W, ELVAX 150, ELVAX 220, ELVAX 240, ELVAX 250, ELVAX 420, ELVAX 450, ELVAX 4260, ELVAX 4320 and ELVAX 4355 have proven to be particularly useful. Ethylene-vinyl acetate based copolymers, such as AT 1825 which is available from AT Plastics Company, can also be effectively employed as a thermoplastic polymer in accordance to the teachings of the present invention. Still other commercially available thermoplastic polymers which are contemplated as being useful include AFFINITY PL 1845 and PL 1880 and ENGAGE EG 8100, EG 8150 and EG 8200, all of which are available from The Dow Chemical Company of Midland, Mich.

The thermoplastic polymer(s) employed in the expandable vibration damping materials of the present invention typically include an amount of from between about 2.0% to 22.0% by weight of the total composition. More preferably, the total constituency of thermoplastic polymers will be present in an amount of between 6.0% to about 18.0% by weight, and still, more preferably in an amount of between about 10.0% to about 16.0% by weight of the total composition.

Also employed in the expandable vibration damping materials are adhesion promoting agents. Ideally, the adhesion promoting agent(s) selected will provide sufficient adhesion characteristics to allow the composition to adhere to the desired substrate, such as automotive grade sheet metal panels (which may or may not be painted, primed or coated with any one of a number of metal working lubricants) without requiring primers or special preparation of the surface to which it will be adhered, or further, without hindering the desired flow characteristics to accomplish the gap or space filling feature of the present invention. In general, it is believed that increased adhesion is accomplished as a result of facilitated wetting of the substrate by a decrease in the overall viscosity of the composition and/or by providing sufficient polarity to the compositions for adherence to a wide variety of substrates.

Preferred adhesion promoting agents employed in the present invention include epoxy novolac resins, low molecular weight ionomers and petroleum based $C_5$ and $C_9$ hydrocarbon resins and polyterpene resins, among others. Without limitation, commercially available epoxy novalac resins considered useful under the present invention include those marketed under the trade name designation D.E.N., such as D.E.N. 431 available from the Dow Chemical Company. Bisphenol A based epoxy resins such DER 331, DER 337, DER 660 and DER 662, all of which are available from the Dow Chemical Company of Midland, Mich., are also considered to be useful. Likewise, a commercially available low molecular weight ionomer useful in association with the present invention is one known as ACLYN® 293A which is a zinc based ionomer available from the Allied Signal Corporation of Morristown, N.J. Still further, adhesions promoting agents which are considered useful include polyterpene based thermoplastic polymers such as WINGTACK 85, WINGTACK 95 and WINGTACK 115 which are available from the Goodyear Chemical Company of Akron, Ohio are considered to be useful. Additionally, ESCOREX 7312, a $C_9$ based material available from the Exxon Chemical Company of Houston, Tex., can also be employed.

The adhesion promoting agent or mixture thereof should be present in an amount of from about 2.0% to about 20.0% by weight and, more preferably, in an amount of from about 6.0% to about 16.0% by weight. Still more preferably, the amount of adhesion promoting agent or agents will be from about 8.0% to about 14.0% based on the total weight of the expandable vibration damping material composition.

In addition to the aforementioned constituents, it is preferred that one or more foaming agent(s) be employed to assist in accomplishing the expansion of the composition during the curing process. Preferably, the foaming agent or agents employed will be commercially available and specifically designed for use with elastomeric polymers. Of the preferred commercially available foaming agents, those such as CELOGEN OT, CELOGEN AZ120 and AZ130, CELOGEN 754, CELOGEN 765 and CELOGEN 780, all of which are available from the Uniroyal Corporation, have proven to be particularly useful. Preferably, the total amount of foaming agent(s) employed will be in the range of between about 0.5% to about 8.0% by weight based on a total constituency weight of 100.0%. More preferably, the foaming agent(s) will be present in an amount of between about 1.0% to about 6.0% by weight, and still more preferably from about 2.0% to about 4.0% by weight.

In addition to the aforementioned constituents, a relatively high percentage of filler may be employed in an effort to control the overall cost of the expandable vibration damping material compositions of the present invention, without sacrificing the performance characteristics. Among the numerous fillers which can be employed, mica, talc, silica, calcium carbonate and other mineral fillers are considered useful. Such fillers are commercially available under various trade names including HUBERCARB, which is available from the J. M. Huber Corporation of Quincy, Ill.; ATOMITE, which is available from ECC International of Atlanta, Ga.; MAGSIL 399 which is available from Whitaker, Clark & Daniels of Plainfield, N.J.; GLACIER 600 which is available from Luzenac America of Englewood, Colorado; SUZORITE 50 SD which is available from Suzorite Mica Products Inc., of Quebec, Canada; and KMG L-125 and KMG F-115, both of which are available from KMG Minerals, Inc., of King Mount, N.C.

Ideally, the particle size of the filler material(s) will be on the order of between 60 Mesh (i.e. 250 microns) to about 550 Mesh (i.e. 25 microns).

The amount of filler employed will typically be in the range of from about 40.0% to about 70.0% based on the total weight of the expandable vibration damping material. More preferably, however, the filler material or mixture thereof will be present in an amount of between about 45.0% to about 65.0% by weight. Still more preferably, the filler material will be present in an amount of between about 50.0% to 60.0% by weight.

Under certain applications, it may also be desirable to include colorizing agents such as carbon black as a proportion of the amount of filler. Typically, the total amount of colorizing agents will be a relatively small amount, i.e. less than 0.5% by weight. Carbon black is commercially available under a variety of trade names from a variety of different sources, such a commercially available carbon black product known as STATEX MRG BLK, offered by Columbian Chemicals Company of Manchester, Mo.

Finally, various rheological modifiers may be optionally employed. For example, to control the rate at which the foaming agent(s) effectuate foaming of the composition, it may be desirable to employ a cross-linking agent such as VAROX DCP-40C or other peroxide based cross-linking agents. By cross-linking the epoxy based adhesion promoter, additional benefits including, but not limited to, corrosion resistance, improved durability of the cured expandable composition and enhanced vibration damping in relatively lightweight compositions can be accomplished.

Typically, the amount of cross-linking agents will be directly proportional to the amount of thermoplastic elastomer employed in the expandable vibration damping material. In general, where one or more cross-linking agents are employed, the amount of cross-linking agent will be on the order of 0.01% to about 0.80% by weight and more preferably, from 0.02% to about 0.5% by weight, wherein higher concentrations are employed with higher concentrations of thermoplastic polymer.

Still other rheological modifiers which may be employed in the expandable vibration damping material compositions of the present invention include epoxy curing agents. The amount of curing agent(s) employed is generally proportional to the concentration of adhesion promoters employed. For example, where the composition includes 2.0% to about 20.0% by weight of an epoxy based adhesion promoter, it is desirable to utilize between about 0.02% to 0.5% by weight of an epoxy curing agent. Likewise, where the amount of epoxy based adhesion promoters is 8.0 wt. % to 14.0 wt. %, the amount of epoxy curing agent would generally be present in an amount of between about 0.15 wt. % to about 0.30 wt. %. Among the commercially available curing agents which can be employed, one known as AMICURE CG-1200 which is dicyandiamide based has proven to be particularly useful.

Examples of comparative products, as well as the products and methods of producing the products according to the teachings of the present invention, will now be provided. It should be noted that the examples provided for the compositions of the present invention are not intended to be limiting, but rather merely set out certain preferred embodiments of the present invention.

Referring to Table II, a formulation labeled as a control was prepared along with three additional sample formulations, designated as Samples A, B and C, respectively, wherein the amount of thermoplastic polymers was altered in each sample as illustrated. Each constituent is listed as the number of grams for a total constituency which ranges from 88.5 grams to 111.66 grams.

modes of vibration at a given temperature of interest, and the damping performance is calculated using the half-power bandwidth technique. According to the half-power band-

TABLE II

| Raw Materials | Control | Sample A | Sample B | Sample C |
|---|---|---|---|---|
| HYBAR VS-1 | 11.54 | — | 2.88 | 23.08 |
| ELVAX 40W | 5.76 | 5.76 | 5.76 | 5.76 |
| ELVAX 4320 | 2.88 | 2.88 | 2.88 | 2.88 |
| AT 1825 | 2.88 | 2.88 | 2.88 | 2.88 |
| ACLYN 293A | 3.28 | 3.28 | 3.28 | 3.28 |
| WINGTACK 95 | 5.12 | 5.12 | 5.12 | 5.12 |
| STATEX MRG BLK | 0.22 | 0.22 | 0.22 | 0.22 |
| HUBERCARB 325 | 55.41 | 55.41 | 55.41 | 55.41 |
| PARAPOL 700 | 6.89 | 6.89 | 6.89 | 6.89 |
| D.E.N 431 | 3.41 | 3.41 | 3.41 | 3.41 |
| CELOGEN OT | 0.70 | 0.70 | 0.70 | 0.70 |
| CELOGEN 765 | 0.70 | 0.70 | 0.70 | 0.70 |
| CELOGEN AZ-130 | 0.70 | 0.70 | 0.70 | 0.70 |
| VAROX DCP 40C | 0.28 | 0.28 | 0.28 | 0.28 |
| AMICURE CG 1200 | 0.35 | 0.35 | 0.35 | 0.35 |
| TOTAL | 100.12 grams | 88.58 grams | 91.41 grams | 111.66 grams |
| Damping values, Oberst test @ 200 Hz unless noted, 1.5 mm mastic w/2.0 mm bondline, 0.026" base bar, 0.026 CL | | | | |
| 10° C. | | | | |
| 25 C. | 0.18 @ 352 Hz | 0.091 | 0.076 | 0.17 @ 350 Hz |
| 40 C. | 0.45 @ 256 Hz | 0.104 | 0.087 | Damped |
| | 0.38 | 0.115 | 0.105 | 0.492 @ 126 Hz |

To prepare the above listed compositions on a laboratory or bench scale, a Baker-Perkins internal mixer was preheated to 220° F. prior to adding any of the constituents. Thereafter, the elastomeric polymer and thermoplastic polymer were simultaneously added to the mixer and mixed at a constant speed for approximately 20 minutes. Thereafter, a composition including 75.0% of the total amount of filler and carbon black to be employed and 25.0% of the total plasticizer to be employed was added to the mixture of elastomeric polymer and thermoplastic elastomer and further mixed for approximately 45 minutes until the composition appeared to become relatively smooth. Subsequently, the mixer was cooled to a temperature of approximately 150° F. and the adhesion promoters including both a low molecular weight ionomer and a petroleum based $C_5$ hydrocarbon were added to the premixed composition with additional mixing for approximately 15 minutes. The remaining 25.0% of the filler and carbon black constituency and 75.0% of the plasticizer were added to the mixture with additional mixing for 15 minutes. Finally, with the mixer cooled to slightly below 150° F., the foaming agents, accelerators, curing agents and epoxy novalac resin adhesion promoter were added to the batch and mixed for another 15 minutes. Upon fully mixing the composition, the product was removed from the mixer and pressed to the desired thickness for testing damping performance.

As set forth at the bottom of Table II, damping performance, otherwise referred to herein as damping values, were obtained utilizing an Oberst test procedure as described in SAE J1637. Oberst testing as described in SAE J1637 involves applying a damping material to be tested on a substrate such as a supporting steel bar and disposing the combined substrate and damping material in an Oberst Testing Apparatus. After positioning the test sample, vibrational waves are generated upon the damped bar at various width technique, first the resonant frequency, f, at a given mode of the bar is measured. Next, the lower and upper frequencies ($f_l$ and $f_u$, respectively) are measured on the response curve on either side of the resonant frequency where the levels are 3 dB lower than the level at resonance (3 dB down points or half-power points). The difference of $f_u$ and $f_l$ is called the half-power bandwidth. This procedure is repeated for other modes of vibration and temperatures.

The composite damping performance is given by the formula:

$$\eta_c = \frac{\Delta f}{f}$$

where:

$\Delta f = f_l - f_u$ = frequency bandwidth, Hz f = resonant frequency, Hz $\eta_c$ = Composite loss factor at resonant frequency f, dimensionless As illustrated in Table II, the effect of increasing the amount of elastomeric polymers and, more particularly, an elastomeric polymer including polystyrene blocks and vinyl bonded polyisoprene blocks, with regard to the vibration damping properties of sample materials are presented. As can be seen from a review of Table II, the inclusion of elastomeric polymers is especially effective at increasing the vibration damping properties at room temperature. When the amount of elastomeric polymer was doubled over the control amount as set forth in Sample C, all of the vibrations were damped at 25° C. This means that the resonance peaks produced under the Oberst test method were so flat that a 3 dB drop could not be measured, i.e. the steel bar was fully damped. In general, the control as well as Samples A, B and C offered increased damping performance as the temperature was increased from 10° C. to 40° C.

At lower temperatures, such as 10° C., the damping values reported remained virtually unchanged regardless of the amount of elastomeric polymers employed. Theoretically, at low temperatures, the elastomeric polymer has insufficient molecular motion to convert the vibration energy to heat, where damping is defined as the amount of energy dissipated as heat during the deformation of a material.

As illustrated in Table III set forth below, three additional samples designated as Sample D, E and F, respectively, were prepared under the method set forth with regard to compositions of Table II wherein the amount of thermoplastic polymer was altered and all other constituents were held constant. After the compositions were prepared, Oberst tests were conducted on the samples set forth in Table III to demonstrate the effects of varying the amounts of thermoplastic polymer and, more specifically, ethylene vinyl acetate copolymer with regard to damping properties. Essentially, the amount of ethylene vinyl acetate copolymer employed had a relatively small effect on the amount of damping which was measured via the Oberst method. Thus, where all other constituents were held constant and very little change was seen when the amount of thermoplastic polymer was changed, the amount of vibration damping seen can theoretically be attributed to the concentration of elastomeric polymer employed.

pelletized, a rotating blade (not shown) cuts the pellets to the desired length for later use.

TABLE IV

| Material | Quantity |
| --- | --- |
| ELVAX 40W | 120.0 lbs. |
| HUBERCARB 325 | 390.0 lbs. |
| PARAPOL 700 | 97.0 lbs. |
| CELOGEN OT | 18.2 lbs. |
| CELOGEN 765 | 18.2 lbs. |
| CELOGEN AZ-130 | 18.2 lbs. |
| ROX DCP 40C | 7.0 lbs. |
| AMICURE CG 1200 | 9.0 lbs. |

Likewise, the batch segment constituency as set forth in Table V below is thoroughly mixed at a temperature of approximately 400° F. for a predetermined amount of time and transferred to an extruder having a set point temperature of approximately 350° F. across each zone. Thereafter, the batch segment is also extruded through a screen changer to a pelletizer having a die temperature of approximately 350° F. and a water jacket temperature of approximately 60° F.

TABLE III

| Raw Materials | Sample D | Sample E | Sample F |
| --- | --- | --- | --- |
| hybar VS-1 | 11.54 | 11.54 | 11.54 |
| ELVAX 40W | — | 1.44 | 11.52 |
| ELVAX 4320 | — | 0.72 | 5.76 |
| AT 1825 | — | 0.72 | 5.76 |
| ACLYN 293A | 3.28 | 3.28 | 3.28 |
| WINGTACK 95 | 5.12 | 5.12 | 5.12 |
| STATEX MRG BLK | 0.22 | 0.22 | 0.22 |
| HUBERCARB 325 | 55.41 | 55.41 | 55.41 |
| PARAPOL 700 | 6.89 | 6.89 | 6.89 |
| D.E.N 431 | 3.41 | 3.41 | 3.41 |
| CELOGEN OT | 0.70 | 0.70 | 0.70 |
| CELOGEN 765 | 0.70 | 0.70 | 0.70 |
| CELOGEN AZ-130 | 0.70 | 0.70 | 0.70 |
| VAROX DCP 40C | 0.28 | 0.28 | 0.28 |
| AMICURE CG 1200 | 0.35 | 0.35 | 0.35 |
| TOTAL | 88.6 grams | 91.48 grams | 111.64 grams |
| Damping values, Oberst test @ 200 Hz unless noted, 1.5 mm mastic w/2.0 mm bondline, 0.026" base bar, 0.026 CL | | | |
| 10° C. | 0.17 @ 375 Hz | 0.17 @ 346 Hz | 0.22 @ 294 Hz |
| 25 C. | 0.36 @ 268 Hz | 0.37 @ 251 Hz | 0.41 @ 195 Hz |
| 40 C. | 0.31 | 0.29 @ 189 Hz | 0.29 |

To prepare production scale quantities of the expandable vibration damping material in accordance with the teachings of the present invention, the constituents will initially be added through a plurality of feeders to an industrial mixer such as a Farrel Mixer having a set point body temperature of approximately 150° F. in two separate segments (referred to hereinafter as a cure segment and a batch segment). After thoroughly mixing the cure segment constituency in the Farrel Mixer as set forth in Table IV below for a predetermined amount of time, the cure segment is transferred to an extruder having a set point temperature of approximately 150° F. across each zone. From there, the cure segment is extruded through a screen changer to a pelletizer having a die temperature of approximately 250° F. and a water jacket temperature of approximately 60° F. As the material is

TABLE V

| Material | Quantity |
| --- | --- |
| HYBAR VS-1 | 156.0 lbs. |
| ELVAX 40W | 16.0 lbs. |
| AT 1825 (R-31) | 39.0 lbs. |
| ELVAX 4320 | 39.0 lbs. |
| ACLYN 293A | 45.0 lbs. |
| HUBERCARB 325 | 545.0 lbs. |
| WINGTACK 95 | 70.0 lbs. |
| STATEX MRG BLK | 3.0 lbs. |
| DEN 431 | 46.0 lbs. |
| PARAPOL 700 | 42.0 lbs. |

At this point, both the cure segment pellets and the batch segment pellets may be stored for future processing or transferred to a sheet extruder having preset temperature zones ranging from approximately 185° F. to 225° F. The cure pellets and batch pellets are added to the sheet extruder in an approximate 1:3 ratio and extruded in elongated sheets. The elongated sheets of expandable vibration damping material are formed into rolls or stacked in sheets until being subsequently die cut to the desired shape and applied to the automobile body panel or other such substrate.

As previously noted, the extruded sheets of expandable vibration damping materials generally do not require separation layers between contiguous portions of the sheet extruded material. Thus, as will be appreciated by those skilled in the art, by providing an expandable vibration damping material which can be stored for extended periods of time, more flexible application processes can be utilized.

Figure 2:
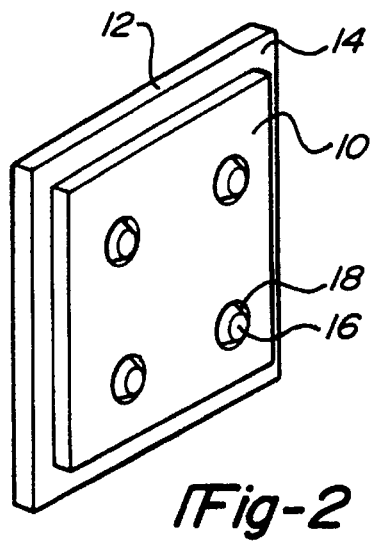
FIG. 2 is a perspective view of an automobile body panel taken along line 2—2 of FIG. 1 showing the expandable vibration damping material of the present invention attached thereto in a constrained layer application.
Figure 3:
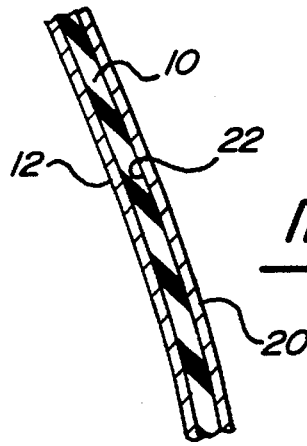
FIG. 3 is a side elevational view of an extruded sheet of the expandable vibration damping material of the present invention attached to a constraint layer on one side and the automobile body panel along other side.
Figure 4:
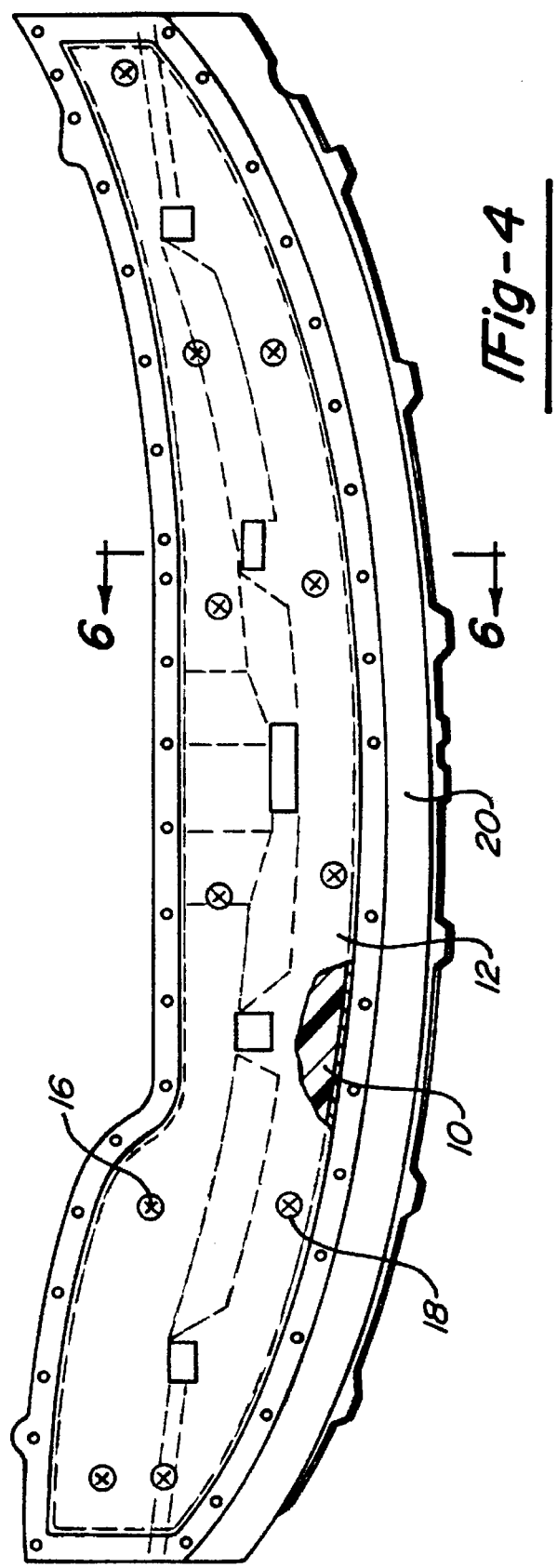
FIG. 4 is an elevational view of an automobile body panel with the expandable vibration damping material of the present invention attached thereto in a constrained layer application.
Figure 5:
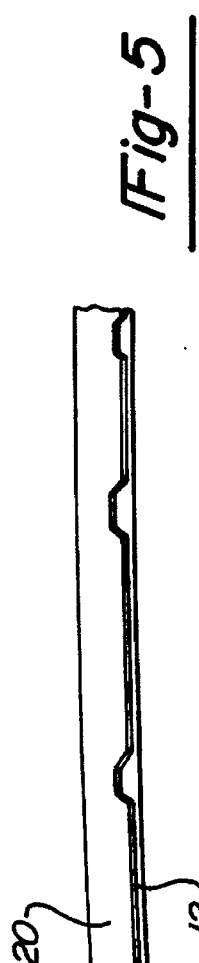
FIG. 5 is a side elevational view of the automobile body panel of FIG. 4.
Figure 6:
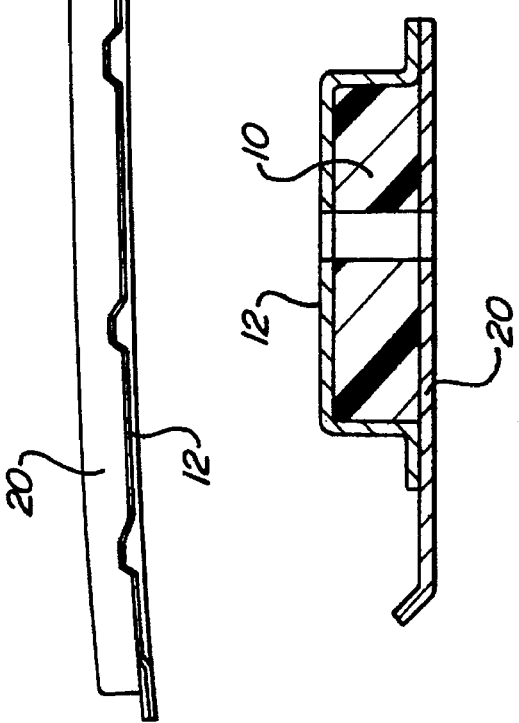
FIG. 6 is a cross-sectional view of the automobile body panel taken along line 6—6 of FIG. 4.

The sheet of expandable vibration damping material can be bonded to the desired substrate (i.e. the constraining sheet or automobile body panel, for example) through the use of commercially available adhesives or by mechanical fasteners in a manner known in the art with regard to vibration damping materials. Preferably, however, especially with regard to constrained layer applications, the sheet of expandable vibration damping material will be heat staked to the automobile body panel or the constraining layer as illustrated in FIG. 2.

Referring to FIGS. 2 through 6, to heat stake the layer 10 of expandable vibration damping material to the constraining sheet 12, the expandable vibration damping material is applied contiguously against the inner surface 14 of the constraining sheet such that the embossments 16 disposed on the constraining sheet extend into and, under certain circumstances, through preformed apertures 18 included on the expandable vibration damping material. Thereafter, the constraining sheet and/or the expandable sheet damping material is heated by induction or some other known means to cause the expandable vibration damping material to at least partially melt along the interface between the constraining sheet and the damping material. Upon removing the source of heat and allowing the expandable vibration damping material to cool, the material readily adheres to the constraining sheet due to the adhesive nature of the damping material. Thus, as will be readily recognized by those skilled in the art, the integral constrained sheet and expandable vibration damping material can be stored for later use if desired.

To apply the constraining sheet 12 and layer 10 of expandable vibration damping material to the automobile body panel 20, whether the layer of damping material is attached to the constraining sheet through the use of adhesives, mechanical fasteners, by heat staking as described, or by a combination of such methods, the constraining sheet is positioned such that the embossments 16 are in contact with the inner surface 22 of the automobile body panel thereby allowing the constraining sheet to be fastened to the panel such as by welding the embossments to the automobile body panel.

Once the constraining sheet has been permanently attached to the inner surface of the automobile body panel, the automobile body panel, integral expandable vibration damping material and constraining layer are heated utilizing a convection oven such as a paint baking oven or E-coat oven which activates the foaming action of the expandable vibration damping material. As the material expands to fill any gaps between the constraining sheet and the automobile body panel, it also conforms to the contour of the automobile body panel, thus providing a structural supporting layer. Further, as the foaming is completed and the vibration damping material begins to cure, the material readily adheres to the automobile body panel as well, thus, providing a protective surface over the panel which assists in limiting underbody corrosion in addition to the vibration damping function.

Thus, as should now be recognized, the expandable vibration damping material of the present invention offers a multi-purpose composition capable of conforming to the geometry of the automobile body panel to which it is adhered without seepage of the material and without requiring the use of specially formulated primers to accomplish the adhesion. Additionally, the expandable vibration material compositions of the present invention offer both improved sound deadening and vibration damping over known compositions, particularly single layer or unlaminated systems.

Various modifications may be made to the above description relating to embodiments of the invention without departing from the spirit and scope of the invention defined in the accompanying claims.

What is claimed is:

1. An expandable vibration damping material composition capable of conforming to the contour of the substrate to which it is applied upon sufficient heating, comprising:
    (a) about 2.0% to about 24.0% by weight of at least one elastomeric polymer;
    (b) about 2.0% to about 14.0% by weight of at least one plasticizer;
    (c) about 2.0% to about 22.0% by weight of at least one thermoplastic polymer;
    (d) about 2.0% to about 20.0% by weight of at least one adhesion promoting agent;
    (e) about 0.5% to about 8.0% of at least one foaming agent; and
    (f) up to about 70% by weight of at least one filler;
wherein the total constituency is equal to 100.0% by weight.

2. The expandable vibration damping material of claim 1, wherein said elastomeric polymer further comprises a tri-block copolymer including polystyrene blocks and vinyl bonded polyisoprene blocks, wherein the isoprene mid-blocks exhibit extensive 3,4 polymerization.

3. The expandable vibration damping material of claim 1, wherein said at least one plasticizer is a viscous polymer comprised of polybutene copolymers.

4. The vibration damping material of claim 1, wherein said at least one thermoplastic polymer comprises an ethylene-vinyl acetate copolymer, an acrylic, polypropylene, polyethylene, or mixtures thereof.

5. The expandable vibration damping material of claim 1, wherein said at least one adhesion promoting agent is selected from the group consisting of $C_5$ and $C_9$ hydrocarbon based epoxy resins, zinc ionomers or mixtures thereof.

6. The expandable vibration damping material of claim 1, wherein said at least one foaming agent is selected from the group consisting of sulfonyl hydrazides, azodicarbonamides and mixtures thereof.

7. The expandable vibration damping material of claim 1, further comprising a cross-linking agent.

8. The expandable vibration damping material of claim 1, wherein said material provides corrosion resistance to the substrate to which it is attached.

9. An expandable vibration damping material composition for a constrained layer application between two substrates, comprising:

(a) about 2.0% to about 24.0% by weight of at least one elastomeric polymer;
(b) about 2.0% to about 14.0% by weight of at least one plasticizer;
(c) about 2.0% to about 22.0% by weight of at least one thermoplastic polymer;
(d) about 2.0% to about 20.0% by weight of at least one adhesion promoting agent;
(e) about 0.5% to about 8.0% of at least one foaming agent; and
(f) up to about 70% by weight of at least one filler;
wherein the total constituency is equal to 100.0% by weight.

10. The expandable vibration damping material of claim 9, wherein said elastomeric polymer further comprises a tri-block copolymer including polystyrene blocks and vinyl bonded polyisoprene blocks, wherein the isoprene mid-blocks exhibit extensive 3,4 polymerization.

11. The expandable vibration damping material of claim 9, wherein said at least one plasticizer is a viscous polymer comprised of isobutylene-butene copolymers.

12. The vibration damping material of claim 9, wherein said at least one thermoplastic polymer comprises an ethylene-vinyl acetate copolymer, an acrylic, polypropylene, polyethylene or mixtures thereof.

13. The expandable vibration damping material of claim 9, wherein said at least one adhesion promoting agent is selected from the group consisting of $C_5$ and $C_9$ hydrocarbon based resins, zinc ionomers or mixtures thereof.

14. The expandable vibration damping material of claim 9, wherein said at least one foaming agent is selected from the group consisting of sulfonyl hydrazides, azodicarbonamides and mixtures thereof.

15. The expandable vibration damping material of claim 9, further comprising a cross-linking agent.

16. An automobile body panel including a vibration damping material composition which is adhered thereto, said composition comprising:
(a) about 2.0% to about 24.0% by weight of at least one elastomeric polymer;
(b) about 2.0% to about 14.0% by weight of at least one plasticizer;
(c) about 2.0% to about 22.0% by weight of at least one thermoplastic polymer;
(d) about 2.0% to about 20.0% by weight of at least one adhesion promoting agent;
(e) about 0.5% to about 8.0% of at least one foaming agent; and
(f) up to about 70% by weight of at least one filler;
wherein the total constituency is equal to 100.0% by weight.

17. The composition of claim 16, wherein said elastomeric polymer further comprises a tri-block copolymer including polystyrene blocks and vinyl bonded polyisoprene blocks, wherein the isoprene mid-blocks exhibit extensive 3,4 polymerization.

18. The composition of claim 16, wherein said at least one plasticizer is a viscous polymer comprised of polybutene copolymers.

19. The composition of claim 16, wherein said at least one thermoplastic polymer comprises an ethylene-vinyl acetate copolymer, an acrylic, polypropylene, polyethylene, or mixtures thereof.

20. The composition of claim 16, wherein said at least one adhesion promoting agent is selected from the group consisting of $C_5$ and $C_9$ hydrocarbon based epoxy resins, zinc ionomers or mixtures thereof.

21. The composition of claim 16, wherein said at least one foaming agent is selected from the group consisting of sulfonyl hydrazides, azodicarbonamides and mixtures thereof.

22. The composition of claim 16, further comprising a cross-linking agent.

23. The composition of claim 16, wherein said material provides corrosion resistance to the substrate to which it is attached.

24. The composition of claim 16, wherein said composition is sandwiched between first and second panels in a constrained layer arrangement.

25. An expandable vibration damping material composition, comprising:
(a) at least one elastomeric polymer comprising a tri-block copolymer including polystyrene blocks and vinyl bonded polyisoprene blocks, said isoprene mid-blocks exhibiting 3,4 polymerization;
(b) at least one plasticizer;
(c) at least one thermoplastic polymer;
(d) at least one adhesion promoting agent;
(e) at least one foaming agent; and
(f) up to about 70% by weight of at least one filler;
wherein the total constituency is equal to 100.0% by weight.

26. The composition of claim 25, wherein said elastomeric polymer further comprises a tri-block copolymer including polystyrene blocks and vinyl bonded polyisoprene blocks, wherein the isoprene mid-blocks exhibit extensive 3,4 polymerization.

27. The composition of claim 25, wherein said at least one plasticizer is a viscous polymer comprised of polybutene copolymers.

28. The composition of claim 25, wherein said at least one thermoplastic polymer comprises an ethylene-vinyl acetate copolymer, an acrylic, polypropylene, polyethylene, or mixtures thereof.

29. The composition of claim 25, wherein said at least one adhesion promoting agent is selected from the group consisting of $C_5$ and $C_9$ hydrocarbon based epoxy resins, zinc ionomers or mixtures thereof.

30. The composition of claim 25, wherein said at least one foaming agent is selected from the group consisting of sulfonyl hydrazides, azodicarbonamides and mixtures thereof.

31. The composition of claim 25, further comprising a cross-linking agent.

32. The composition of claim 25, wherein said material provides corrosion resistance to the substrate to which it is attached.

33. The composition of claim 25, wherein said composition is sandwiched between first and second panels in a constrained layer arrangement.

* * * * *